Figure 1:
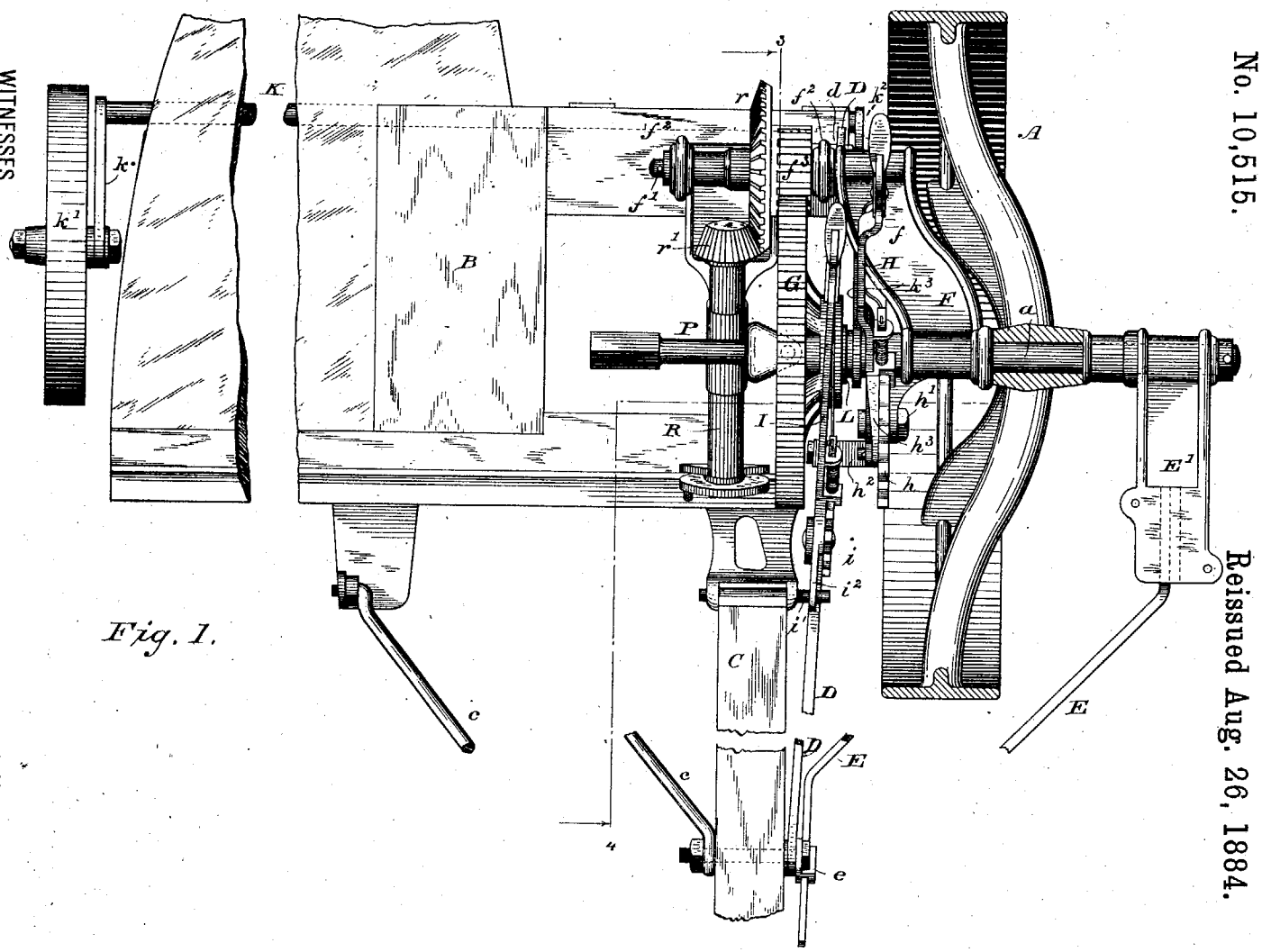

5 Sheets—Sheet 1.

H. E. PRIDMORE.

Assignor to McCormick Harvesting Machine Company.

HARVESTER.

No. 10,515. Reissued Aug. 26, 1884.

WITNESSES

Wm A. Skinkle

Henry A. Lamb

INVENTOR

Henry E. Pridmore

By his Attorneys

Parkinson & Parkinson

N. PETERS, Photo-Lithographer, Washington, D. C.

H. E. PRIDMORE.

Assignor to McCormick Harvesting Machine Company.

HARVESTER.

No. 10,515. Reissued Aug. 26, 1884.

WITNESSES

Wm. A. Skinkle

Henry A. Lamb

INVENTOR

Henry E. Pridmore

By his Attorneys

Pancoast & Pancoast

N. PETERS, Photo-Lithographer, Washington, D. C.

5 Sheets—Sheet 3.

H. E. PRIDMORE.

Assignor to McCORMICK HARVESTING MACHINE COMPANY.

HARVESTER.

No. 10,515. Reissued Aug. 26, 1884.

WITNESSES

Wm A. Skinkle

Henry A. Lamb

INVENTOR

Henry E Pridmore

By his Attorneys

Parkinson & Parkinson

N. PETERS, Photo-Lithographer, Washington, D. C.

5 Sheets—Sheet 4.

H. E. PRIDMORE.

Assignor to McCormick Harvesting Machine Company.

HARVESTER.

No. 10,515. Reissued Aug. 26, 1884.

WITNESSES

Wm A. Skinkle

Henry A. Lamb

INVENTOR

Henry E. Pridmore

By his Attorneys

Parkinson & Parkinson

N. PETERS, Photo-Lithographer, Washington, D. C.

H. E. PRIDMORE.

Assignor to McCormick Harvesting Machine Company.

HARVESTER.

No. 10,515. Reissued Aug. 26, 1884.

WITNESSES

Wm A. Skinkle

Henry A. Lamb

INVENTOR

Henry E. Pridmore

By his Attorneys

Dancuson & Dancuson

N. PETERS, Photo-Lithographer, Washington, D. C.

UNITED STATES PATENT OFFICE.

HENRY E. PRIDMORE, OF CHICAGO, ILLINOIS, ASSIGNOR TO McCORMICK HARVESTING MACHINE COMPANY, OF SAME PLACE.

HARVESTER.

SPECIFICATION forming part of Reissued Letters Patent No. 10,515, dated August 26, 1884.

Original No. 270,120, dated January 2, 1883. Application for reissue filed May 1, 1883.

DIVISION A.

*To all whom it may concern:*

Be it known that I, HENRY E. PRIDMORE, of Chicago, in the county of Cook and State of Illinois, have invented certain new and useful Improvements in Harvesters, of which the following is a specification.

The invention relates to that type of harvesters commonly termed "one-wheel"—that is, having at the inner or stubble end a main or driving wheel and at the opposite or outer end a grain-wheel or caster, with a platform, usually segmental, but sometimes rectangular, supported between the two, and a sweep or other rake to clear the gavels therefrom; and it consists in improved means for raising and lowering said platform; in improved means for tipping said platform upon its supporting or carrying wheels to change the angle of the knives to the standing grain or to pick up lodged grain; in suspending said platform at its inner end from a supporting-bar pivoted to the draft-tongue, and raising and lowering said bar by means of a link from a lever pivoted to a bracket sleeved upon the main axle and connected with the prime-pinion shaft; in suspending the inner end of said platform from a supporting-bar pivoted to the draft-tongue, and making the front connection with said bar by means of a link from a lever pivoted thereon latching into a segment, whereby the front of the platform may be raised and lowered toward and from said bar to tip it relatively to its carrying-wheels; in the combination of a main or driving wheel, a main axle, a bracket sleeved thereon and connected by a rearwardly-extending radius-arm with the prime-pinion shaft journaled in brackets from the platform, a cranked shaft running longitudinally beneath the platform and bearing in the arm at its outer end the grain-wheel and link connected from the arm at its inner end to the main axle, a supporting-bar pivoted at its front end to the draft-tongue and at its rear end sliding in a keeper at the rear of the platform, a lever pivoted to a front extension of the bracket upon the main axle, a rack upon said extension, into which a dog from the lever takes to hold it in its adjusted position, a link or other connection between an arm of said lever and the supporting-bar, a second lever pivoted to a bracket upon said supporting-bar and latching into a rack in said bracket, and a link or other connection between the lifting-arm of this lever and the front of the platform, whereby the platform may be raised and lowered or tipped at will; in the combination of a main or driving wheel, a platform, a grain-wheel at the outer end of said platform, supported upon an arm from a cranked shaft running longitudinally therebeneath, a link connecting a second arm from said cranked shaft at its inner end with the main axle, a draft-tongue hinged to the front of the platform, a bracket for the seat-standard and foot-rest sleeved to the outer end of the main axle, an arm rigid with said bracket taking at its front end into a keeper upon the draft-tongue, a supporting-bar pivoted at its front end to the draft-tongue and at its rear end sliding in a keeper at the rear of the platform, a bracket mounted upon the main axle inside the wheel, connected by means of a rearwardly-extending radius-arm with the prime-pinion shaft, and by a second forwardly-extending arm affording a pivot and rack for a lever linked with the supporting-bar, and a second lever pivoted upon said supporting-bar, latching into a rack therefrom, and connected with the front of the platform; in the combination of a main wheel, an axle keyed thereto and turning therewith, a bracket sleeved upon said axle inside of the main wheel, and connected by a rearwardly-extending radius-arm with the prime-pinion shaft mounted in bearings upon the platform, a main gear-wheel upon said axle inside of the bracket, and a clutch or backing-ratchet between said wheel and the axle; and in the various other combinations and details of construction hereinafter set forth.

Figure 2:
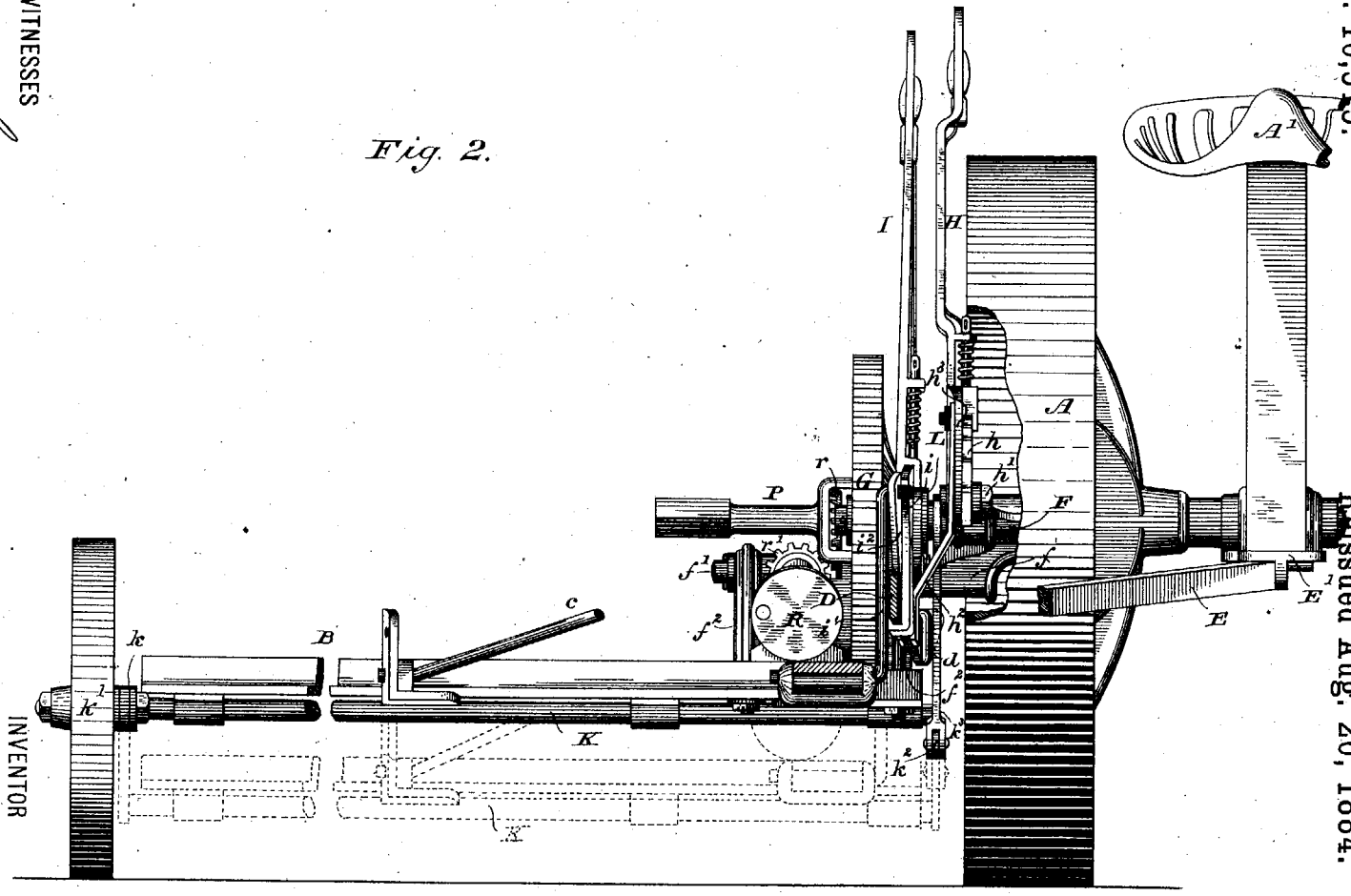
Figure 3:
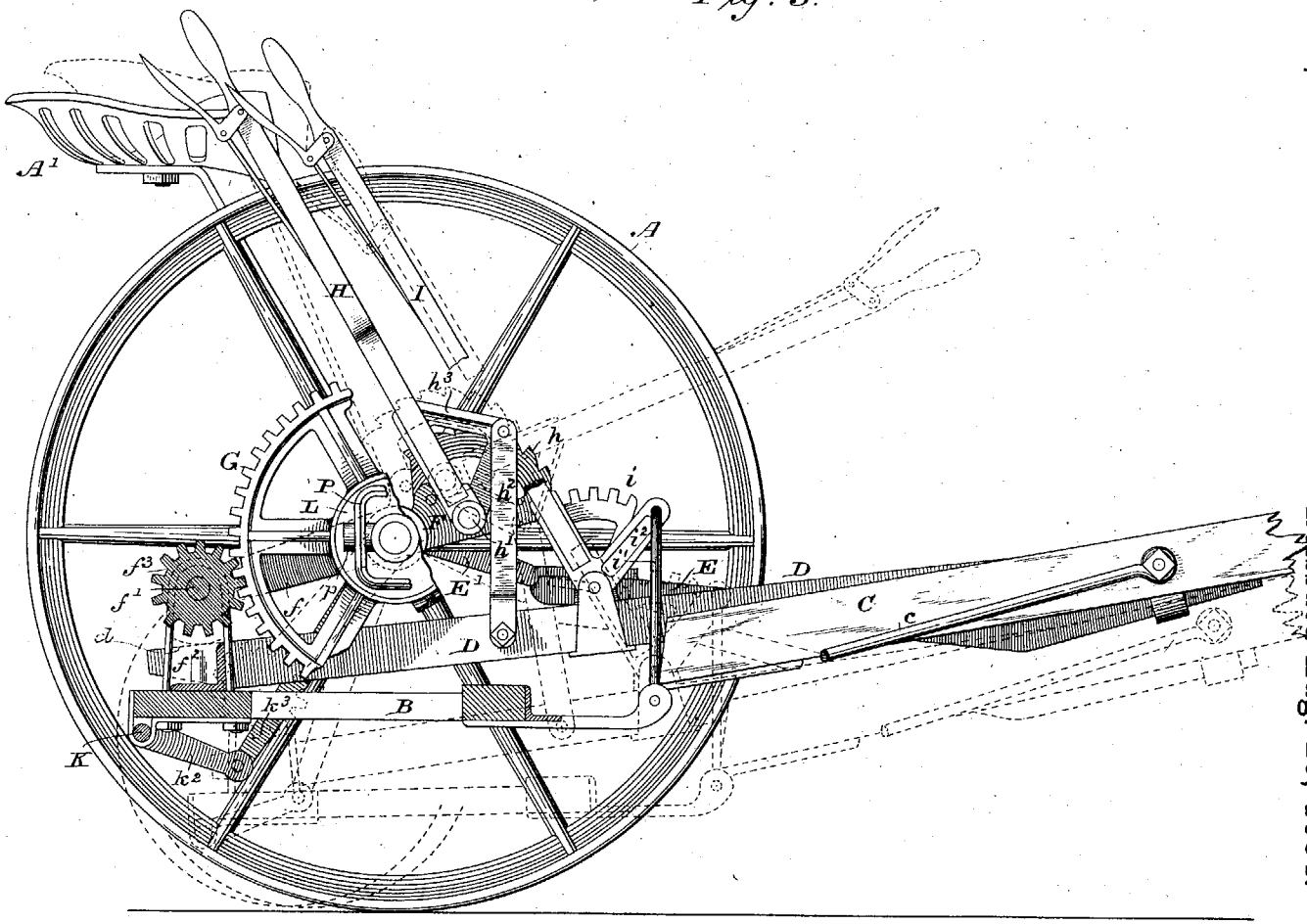
Figure 4:
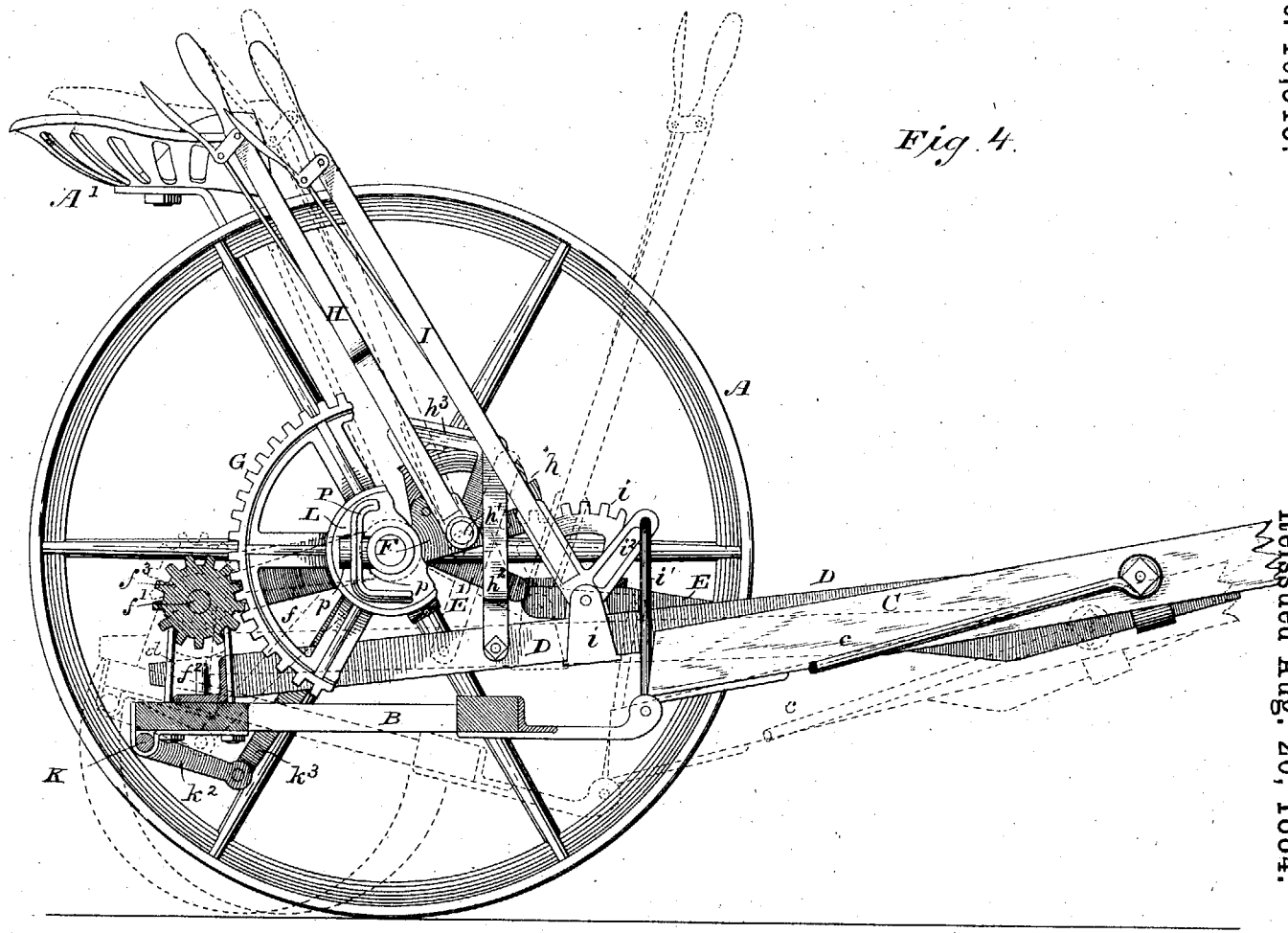
Figure 5:
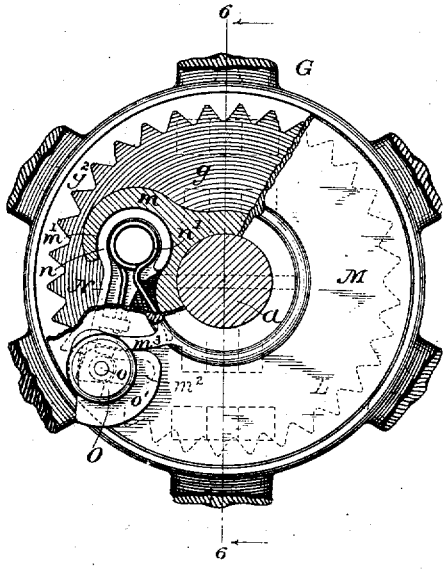
Figure 6:
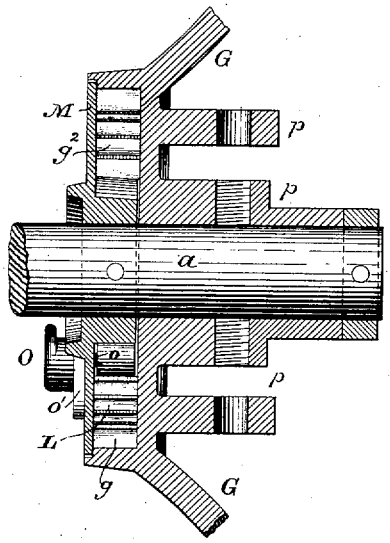
Figure 7:
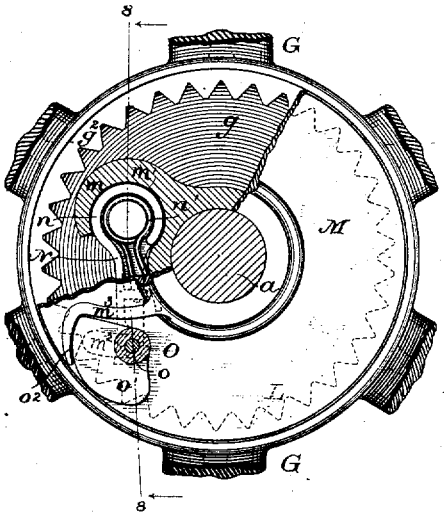
Figure 8:
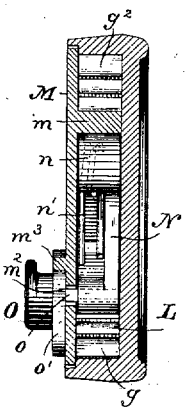

In the drawings, Figure 1 is a top plan view of a harvester embodying my invention, with the main wheel in section. Fig. 2 is a front elevation thereof. Fig. 3 is a side elevation from the grain end, with the platform in section and the vertical adjustment of the latter indicated in dotted lines. Fig. 4 is a like side elevation to illustrate the tipping adjustment; Figs. 5 and 6, details of the clutch between the main axle and the main gear-wheel with the dog engaged; and Figs. 7 and 8 are details of such clutch with the dog out of engagement.

A is the main wheel, for the purpose of the present gearing keyed fast to its axle *a*, but, if demanded by the nature of other gearing substituted therefor in the machine, allowed to turn loosely on said axle; and A′ is the seat, supported at the stubble side of said wheel upon a standard rising from a bracket or casting sleeved upon the axle.

B is the platform, of any suitable shape required by the action of the raking mechanism or by the nature of the harvester. To the front of this platform is hinged the rear end of the draft-tongue C, connected also by a hound, *c*, with the inside shoe or divider. Pivoted to this draft-tongue, either by the same bolt securing the front end of the hound or at another suitable point, is a strong bar, D, hereinafter called the "supporting-bar" or "frame-bar," which runs back to the rear inner corner of the platform, or thereabout, and is there confined by a keeper, *d*, in which it is allowed to play longitudinally; and, to compensate for the tipping of the platform, it has its under surface at this end beveled. Another bar or brace, E, rigid with the seat-support and foot-rest E′, sleeved to the stubble end of the axle, is brought to the tongue at the pivotal point of the frame-bar, and is there confined with capacity of longitudinal play in a keeper, *e*, also preferably secured by the pivot-bolt of the hound, and having a pendulum movement, so as to support the seat in its proper position during the vertical and tipping adjustments of the platform.

A bracket-casting, F, is sleeved to the axle inside the main wheel, and provided with a rearwardly-extending arm, *f*, secured to the prime-pinion shaft $f'$, supported in standards $f^2$ at the rear inner corner of the platform, above or adjacent to the keeper for the frame-bar, said arm thus serving as a radius-bar to keep the prime pinion $f^3$ in mesh with the main gear G, mounted upon the axle outside of the bracket-casting. In front of the axle the casting F is vertically flattened and enlarged to form a segment-rack, *h*, with its teeth preferably set ratchetwise for the raising, lowering, and supporting lever H, which lever is pivoted to the casting at $h'$, concentric with said rack, and, by means of a link, $h^2$, depending from its crank-arm or offset $h^3$, is connected with the frame-bar D at a point over the front part of the platform, thus serving to support said frame-bar from the axle, and through it the rear end of the platform. A second lever, I, is pivoted to a segment-casting, *i*, bolted to the frame-bar a little to the rear of the tongue-joint, and, by means of a link, $i'$, connecting its arm $i^2$ with said joint or with the platform, serves to raise and lower the front of the platform or to hold it in fixed relation to the frame-bar. Both levers are provided with hand-pieces and links controlling latches which take into the racks upon their respective segments and hold them in any given adjustment. It will be understood that, instead of these link-connections between the lever-arms and the bodies which they support, chains or other suitable instrumentalities may be employed. The links, however, are preferable in this, that they hold said bodies rigidly to their work and prevent wabbling or jumping.

Journaled in hangers beneath the platform is a shaft, K, parallel with the finger-bar, but set sufficiently back therefrom according to the depth of the platform to serve its purpose. At the grain end this shaft has a crank or arm, *k*, forming a support for the grain-wheel $k'$ or caster, and at its inner end, near the main wheel, another arm, $k^2$, at a slight angle to the former, for more effective leverage, but extending in the same direction—that is, forward—and directly connected by a link, $k^3$, with the main axle, said link being sleeved to the axle so as to swing thereabout, the second arm, however, being somewhat shorter than the grain-wheel support, so that as the platform is raised and lowered in reference to the axis of the main wheel the relative movement of the grain-wheel controlled by the link from said axis shall keep pace with that of the main wheel, and the grain end of the platform rise and fall parallel with the stubble end.

Now, supposing the tipping-lever I to be set at any given adjustment, the front end of the platform will be held in fixed relation to the frame-bar immediately above, and if the raising and lowering lever H is manipulated in the appropriate direction this frame-bar will lift the platform concurrently in front and rear, preserving its fore and aft parallelism. Meanwhile, as the main wheel must relatively sink, it will operate the rock-shaft through its link-connection with the inner arm thereof, and will move the grain-wheel down a corresponding distance, so as to preserve the endwise parallelism of the platform to its original position; but, supposing that it is desired to tip the platform upon a given vertical adjustment, the raising and lowering lever H will remain untouched, supporting the frame-bar, the rear of the platform, and the tipping-lever I at their fixed height, and the latter lever will be moved upon its pivot, so as to raise the front of the platform or to lower it, as may be desired. Either of these adjusting movements will cause a flexion of the draft-tongue upon its pivots, which will be compensated for by the play of the frame-bar in its keeper, and as to the seat by the play of the arm therefrom in the pendulum or other guide upon the tongue, while, as before intimated, the prime pinion will be kept in mesh with the main gear by the action of the radius-arm from the bracket sleeved upon the main axle and supporting the raising and lowering lever.

It is evident that the frame-bar, instead of being pivoted to the draft-tongue at the front end and playing in a keeper on the platform at the rear end, can, with the same effect, be pivoted to the platform or a bracket therefrom at the rear end, and play in a keeper on the draft-tongue at the front end. Therefore, whenever it is qualified in the claims hereinafter as secured in the former way, it is to be understood that the latter is included as an equivalent. It is also evident that the bevel on the rear end of the frame-bar can be omitted and some other compensatory device adopted, as a slot in the platform or a raised keeper having rollers between which the bar plays.

The main gear may be fixed to the main wheel, as in many harvesters now in use, in which case the latter wheel may run loose upon the axle; but, as already stated, I prefer that the main wheel shall be keyed fast to said axle, and mount the main gear G loosely on the axle, connecting it therewith by a backing-ratchet, L, so that it shall be driven in one direction only. In order to permit this backing-ratchet to be thrown entirely out of action for transporting the machine, it is constructed as shown in Figs. 5 and 6—that is, a disk, M, is pinned to the axle on the inner side of the gear-wheel, completely closing the ratchet-chamber $g$ therein, so as to shield the mechanism within it. From the hub of this disk, within the chamber, is an offset, $m$, having a cylindriform recess, $m'$, with an opening to one side. Within this recess is set the cylindrical head $n$ of the dog N, having its tongue passing through and playing within the lateral opening. The head is socketed to receive the coil of a spring, $n'$, one end of which bears against the hub and the other against the tongue of the dog to force it into engagement with the teeth of the ratchet $g^2$. Near the point of the dog a slot, $m^2$, is cut through the covering-disk on an arc concentric with the axis of the dog. A cam-button, O, is placed exteriorly to the disk, with its spindle $o$ entering through the slot to a pivotal seat in the end of the dog, and its cam or latch $o'$ resting upon the face of said disk. When the dog is in engagement, the spindle of the button will be at one end of the slot. In order to disengage it, the button is pressed backward toward the other end, and then turned until its cam or latch enters into a recess, $o^2$, of suitable shape, formed within a web or rib, $m^3$, on the face of the covering-disk, where it will be kept by the pressure of the spring until intentionally released by turning the button, when the dog will be again forced into engagement. The specific features of this clutch, apart from the combinations into which it may enter with other operative mechanism in a harvester, are made the subject-matter of Letters Patent No. 272,152, granted on the 13th day of February, 1883, to the McCormick Harvesting Machine Company as my assignee.

Upon the outer face of the gear-wheel are lugs $p$, to which is bolted the swiveling member or gimbal of a telescoping tumbling-shaft P, driving the rake located at the inner front corner of the platform. The prime-pinion shaft, mounted, as above mentioned, in bearings on the rear of the platform, with its pinion meshing with said gear and kept in engagement therewith by the radius-arm of the bracket-casting on the main axle, carries, immediately beyond the pinion and integral with it, a beveled gear-wheel, $r$, which drives a beveled pinion, $r'$, fast to the end of the crank-shaft R, running transversely along the inner end of the platform and beneath the tumbling-shaft, until its wrist-pin is brought in proper relation to the heel of the cutter-bar. Thus the main gear, driven immediately from the main axle in the forward movement of the machine, drives the rake by direct tumbling-shaft connection, and the cutter crank-shaft by means of the prime pinion and single set of bevel-gears, and on the other hand, when from any reason thrown out of action with said axle, causes both rake and cutter-bar to stand at rest.

To economize space and bring the platform close to the inner edge of the main wheel, the latter is made flaring or dishing inwardly, and the bracket, with its radius-arm, suitably bent and formed to coincide with said dish shape, thus enabling the end of the prime-pinion shaft to be set close to or within the main-wheel rim. The main gear is also dished, and the ears for the attachment of the tumbling-shaft formed upon the dished face close to the axle or supporting-shaft.

I claim as my invention—

1. The combination, substantially as hereinbefore set forth, of the platform, the draft-tongue pivoted thereto, the frame-bar pivoted to the draft-tongue and connected at its rear end to the rear inner corner of the platform, a connection between said frame-bar and the platform at the front of the latter, and a lever pivoted to a bracket sleeved upon the main axle and connected to said frame-bar at a point between the two points of attachment of the platform.

2. The combination, substantially as hereinbefore set forth, of the main wheel, its axle, the platform, a draft-tongue hinged thereto, the frame-bar pivoted to the draft-tongue and connected to the platform at the rear inner corner of the latter and also near the finger-bar, a lever pivoted to a bracket upon the main axle, and the link connecting said lever with the frame-bar.

3. The combination, substantially as hereinbefore set forth, of the main wheel, its axle, the platform, the draft-tongue hinged thereto, the frame-bar hinged to the draft-tongue and at its rear end playing within a keeper at the rear inner corner of the platform, a lever mounted upon a bracket on the axle and link-connected to said frame-bar, and a second lever mounted upon the frame-bar in advance of the connection of the former and link-connected to the front of the platform.

4. The combination, substantially as hereinbefore set forth, of the main wheel, its axle, the platform, the draft-tongue hinged thereto, the frame-bar hinged to said draft-tongue and at its rear end playing within a keeper at the rear inner corner of the platform, the bracket sleeved upon the axle and at its rear connected to the prime-pinion shaft by means of a radius-arm, and the raising and lowering lever pivoted to a segment-extension of said bracket in advance of the axle and link-connected to the frame-bar.

5. The combination, substantially as hereinbefore set forth, of the main wheel, its axle, the platform having brackets or standards for the prime-pinion shaft, the draft-tongue hinged to said platform, the frame-bar pivoted to the draft-tongue and at its rear end playing within a keeper at the rear inner corner of the platform, the bracket-casting sleeved upon the main axle and connected by a radius-arm at the rear with the prime-pinion shaft, the raising and lowering lever pivoted to a segmental extension of said bracket in advance of the axle, and the tipping-lever pivoted to a segment-bracket upon the frame-bar in advance of the connection of the other lever, and itself link-connected with the front of the platform.

6. The combination, substantially as hereinbefore set forth, of the main wheel, its axle, the platform, the draft-tongue hinged thereto, the frame-bar pivoted to the draft-tongue and at its rear end playing in a keeper at the rear inner corner of the platform, an adjustable connection between said frame-bar and platform at the front of the latter, the raising and lowering lever pivoted to a bracket on the main axle and link-connected with said frame-bar, and the seat-support sleeved upon the axle outside of the main wheel and connected with the draft-tongue by an arm playing in a keeper on the latter.

7. The combination, substantially as hereinbefore set forth, of the main wheel, its axle, the platform, the draft-tongue hinged thereto, the frame-bar pivoted to said draft-tongue and connected to the platform at its rear, and means whereby said frame bar is supported from the main axle, a segment-rack bolted to the frame-bar above or nearly above the finger-bar of the platform, a lever pivoted to said segment, and a connection between said lever and the front of the platform, for the purpose of tipping the latter.

8. The combination, substantially as hereinbefore described, of the main wheel, its axle, the platform, the draft-tongue hinged thereto, the frame-bar pivoted to the draft-tongue, connections between said frame-bar and platform at both front and rear of the latter, a lever pivoted to a bracket on the main axle and connected with said frame-bar intermediate of the points of attachment thereto of the platform, whereby the frame-bar and platform may be raised and lowered, and a crank-shaft running beneath the platform, supporting in the arm or crank at its outer end the grain-wheel, and having a direct connection by means of a link or radius-bar between the arm or crank at its inner end and the main axle.

9. The combination, substantially as hereinbefore described, of the main wheel, its axle, the platform, the draft-tongue hinged thereto, a frame-bar pivoted to the draft-tongue and at its rear end playing within a keeper at the rear inner corner of the platform, the raising and lowering lever pivoted to a bracket on the main axle and connected with said frame-bar, the tipping-lever mounted upon said frame-bar in front of the connection of the other therewith and connected to the front of the platform, and the crank-shaft journaled in bearings beneath the platform, supporting the grain-wheel by means of the arm at its outer end, and having a direct link-connection between the arm at its inner end and the main axle.

10. The combination, substantially as hereinbefore described, of the main wheel, its axle, the platform supporting the prime-pinion shaft on brackets at its rear, the draft-tongue hinged to said platform, the frame-bar pivoted to the draft-tongue and playing in a keeper at the rear inner corner of the platform, the bracket sleeved upon the axle and connected at its rear by a radius-arm with the prime-pinion shaft, the raising and lowering lever pivoted to a segment-extension of said bracket in advance of the axle and connected with the frame-bar to support it, the tipping-lever pivoted to a segment-bracket upon said frame-bar and connected to the front of the platform, the cranked shaft mounted in hangers beneath the platform, the grain-wheel supported in the outer arm or crank of said shaft, and the link or radius-bar directly connecting the inner arm or crank of the shaft with the main axle.

11. The combination, substantially as hereinbefore set forth, of the main or driving wheel, the platform, the grain-wheel at the outer end of said platform, supported upon an arm from a cranked shaft running longitudinally therebeneath, a link connecting a second arm from said cranked shaft at its inner end with the main axle, the draft-tongue hinged to the front of the platform, the bracket for the seat-standard and foot-rest, sleeved to the outer end of the main axle, an arm rigid with said bracket taking at its front end into a keeper upon the draft-tongue, a supporting-bar pivoted at its front end to the draft-tongue and at its rear end sliding in a keeper at the rear of the platform, a bracket mounted upon the main axle inside the wheel, connected by means of a rearwardly-extending radius-arm with the prime-pinion shaft, and by a second forwardly-extending arm affording a pivot and rack for the lever connected with the frame-bar, and a second lever pivoted upon said frame-bar, latching into a rack therefrom, and connected with the front of the platform.

12. The combination, substantially as hereinbefore described, of the main or driving wheel, the axle keyed thereto and turning therewith, the bracket sleeved upon said axle inside of the main wheel and connected by a rearwardly-extending radius-arm with the prime-pinion shaft mounted in bearings upon the platform, the prime pinion on said shaft, the main gear-wheel mounted loosely upon said axle inside of the bracket, and a clutch or backing-ratchet between said wheel and the axle.

13. The combination, substantially as hereinbefore described, of the main wheel, the axle keyed thereto and turning therewith, the bracket sleeved upon said axle inside of the main wheel and connected by a rearwardly-extending radius-arm with the prime-pinion shaft mounted in bearings upon the platform, the prime pinion on said shaft, the two bevel-gears connecting said shaft with the cutter crank-shaft, the main gear-wheel mounted loosely upon the axle inside of the bracket, and the clutch or backing-ratchet between said gear-wheel and the axle.

14. The combination, substantially as hereinbefore set forth, of the main wheel, the axle keyed thereto and turning therewith, the main gear-wheel mounted loosely upon said axle, the clutch or backing-ratchet between said axle and wheel, and tumbling-shaft pinned to lugs on the outer face of said wheel and driving the rake.

15. The combination, substantially as hereinbefore set forth, of the main wheel, the axle keyed thereto and turning therewith, a radius-arm connecting said axle with the prime-pinion shaft mounted in bearings upon the platform, the prime pinion on said shaft, the two bevel-gears connecting it with the cutter crank-shaft, the main gear-wheel mounted loosely upon the axle and meshing with said prime pinion, the clutch or backing-ratchet between the axle and said wheel, and the tumbling-shaft pinned to lugs on the outer face of said wheel and driving the rake.

16. The combination, substantially as hereinbefore set forth, of the main wheel, the axle keyed thereto and turning therewith, the main gear-wheel mounted loosely upon said axle and driving by an intermeshing train the cutter crank-shaft, the tumbling-shaft pinned to lugs on the outer face of said gear-wheel and driving the rake, and the controllable clutch or backing-ratchet between the axle and gear-wheel, whereby cutting and raking mechanisms may be simultaneously thrown out of action.

17. The combination, substantially as hereinbefore set forth, of the main wheel, the main axle keyed thereto, the main gear, ratchet-clutched to said axle, the prime-pinion shaft mounted in brackets upon the platform, the bracket sleeved upon the axle between the main wheel and the main gear and connected by a rearwardly-extending radius-arm with said shaft, a segmental front extension of said bracket-arm having back-set or ratchet teeth, and the lever and its dog pivoted upon said extension and latching into the series of ratchet-teeth.

18. The supporting or frame bar pivoted in front to the draft-tongue, and at its rear end taking into a keeper at the rear inner corner of the platform.

19. The supporting-bar pivoted to the draft-tongue, and at its rear end taking into a keeper at the rear inner corner of the platform, and beveled at said end, as and for the purpose described.

20. The dished main gear-wheel, provided with lugs within the dish to receive the ears of the swiveling member or gimbal of the tumbling-shaft, substantially as set forth.

21. The combination of the dished main wheel, the radius-bar bent to conform thereto, and the prime-pinion shaft, substantially as described.

22. The combination of the dished main wheel, the sleeved bracket, and its radius-arm bent to conform to said dish, the prime-pinion shaft, the dished main gear, and the tumbling-shaft attached thereto within the dish.

23. The tongue-hound, frame-bar, and arm from the seat-bracket, all connected to the draft-tongue by a single through-bolt, substantially as described.

HENRY E. PRIDMORE.

Witnesses:

LADISLAS DE BÁNÓ,

JOHN V. A. HASBROOK.